US012682079B2

(12) United States Patent
Radford et al.

(10) Patent No.: US 12,682,079 B2
(45) Date of Patent: Jul. 14, 2026

(54) PORTAL FOR SUBMITTING SECURITY VULNERABILITIES VIA THIRD-PARTY WEBSITES

(71) Applicant: Bugcrowd Inc., San Francisco, CA (US)

(72) Inventors: Damien Michael Radford, San Francisco, CA (US); Casey John Ellis, Lafayette, CA (US)

(73) Assignee: Bugcrowd Inc., San Francisco, CA (US)

( * ) Notice: Subject to any disclaimer, the term of this patent is extended or adjusted under 35 U.S.C. 154(b) by 0 days.

(21) Appl. No.: 18/900,583

(22) Filed: Sep. 27, 2024

(65) Prior Publication Data

US 2026/0093817 A1 Apr. 2, 2026

(51) Int. Cl.
*G06F 21/57* (2013.01)
*G06F 40/20* (2020.01)

(52) U.S. Cl.
CPC ............ *G06F 21/577* (2013.01); *G06F 40/20* (2020.01)

(58) Field of Classification Search
CPC ............................. G06F 21/577; G06F 40/20
See application file for complete search history.

(56) References Cited

U.S. PATENT DOCUMENTS

| | | | |
|---|---|---|---|
| 2017/0185612 A1* | 6/2017 | Kamadolli | .......... G06F 21/6263 |
| 2020/0074084 A1* | 3/2020 | Dorrans | ................ G06F 21/577 |
| 2024/0333746 A1* | 10/2024 | Williams | ............ G06F 21/6245 |
| 2025/0021466 A1* | 1/2025 | Gray | .................. G06F 16/3329 |
| 2025/0150458 A1* | 5/2025 | Sengupta | .............. H04L 63/105 |

* cited by examiner

*Primary Examiner* — Sm A Rahman
(74) *Attorney, Agent, or Firm* — Fenwick & West LLP

(57) ABSTRACT

A system allows users to submit security vulnerabilities for systems associated with websites. The system receives, a request for submission of a security vulnerability associated with a website. The request is received via a widget displayed on a webpage of a website. A user interface is configured for receiving details of the security vulnerability. The user interface is sent for display in association with the website. Information describing the security vulnerability is received via the user interface. The information comprises a natural language description of the security vulnerability. A vulnerability tracking system is selected from a plurality of vulnerability tracking systems based on the details of the security vulnerability. The information describing the security vulnerability is routed via a secure channel to the vulnerability tracking system selected.

20 Claims, 5 Drawing Sheets

400

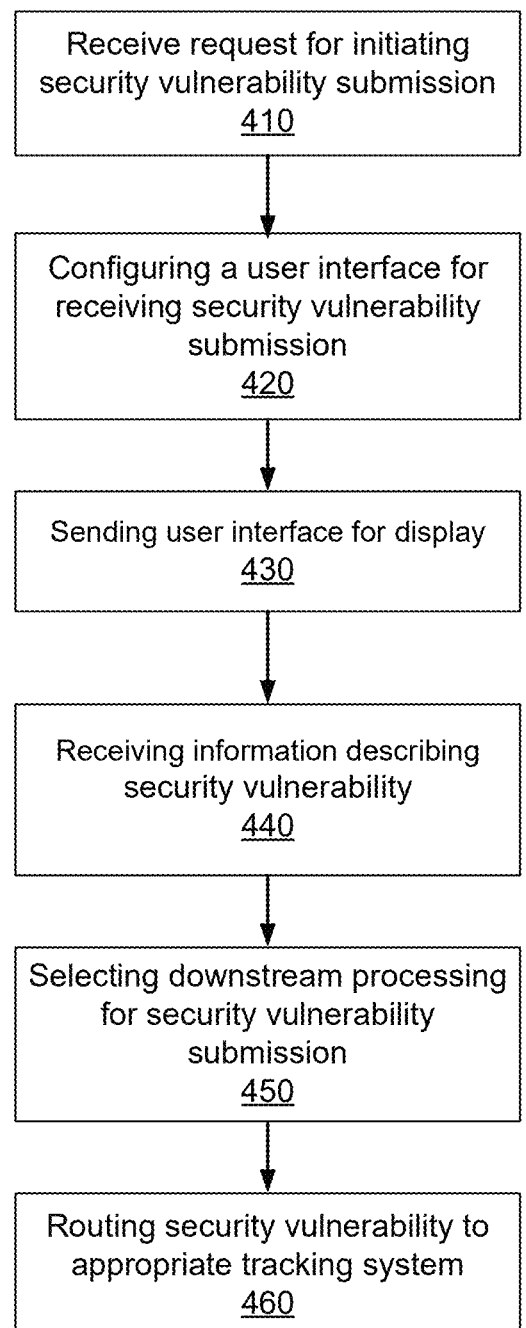

Receive request for initiating
security vulnerability submission
410

Configuring a user interface for
receiving security vulnerability
submission
420

Sending user interface for display
430

Receiving information describing
security vulnerability
440

Selecting downstream processing
for security vulnerability
submission
450

Routing security vulnerability to
appropriate tracking system
460

FIG. 4

PORTAL FOR SUBMITTING SECURITY VULNERABILITIES VIA THIRD-PARTY WEBSITES

BACKGROUND

Field of Art

This disclosure relates in general to software security and more specifically to reporting of security vulnerabilities associated with third-party websites.

Description of Related Art

Software systems such as websites often have security vulnerabilities. Such security vulnerabilities may be identified by end-users, for example, users or hackers studying such software systems. System or website developers would like these security vulnerabilities to be reported via websites describing these systems. However, each website needs to be modified to provide the user interfaces for submitting such security vulnerabilities. Alternatively, a separate website may be provided that allows users to submit such vulnerabilities. However, users who have discovered a security vulnerability need to be aware of such a website and know how to navigate the website. If finding such a website and navigating the website is cumbersome, users are unlikely to report the security vulnerability, thereby increasing the likelihood of exposing users of the website or system to the security vulnerability.

SUMMARY

A system allows users to submit security vulnerabilities via third-party websites. The system receives, a request for submission of a security vulnerability associated with a website. The request is received via a widget displayed on a webpage of a website. The widget may be displayed on multiple webpages of the website and the widget may be further displayed on multiple websites. As an example, the widget may be displayed in the footer of a web page. A user interface is configured for receiving details of the security vulnerability. The user interface is sent for display in association with the website. Information describing the security vulnerability is received via the user interface. A vulnerability tracking system is selected from multiple vulnerability tracking systems based on the information describing the security vulnerability received by the system. The information describing the security vulnerability is routed via a secure channel to the vulnerability tracking system selected.

According to an embodiment, the information describing the security vulnerability includes a natural language description that is processed by the system using a machine learning based language model.

Embodiments of a computer readable storage medium store instructions for performing the steps of the above methods. Embodiments of a computer system comprise one or more computer processors and a computer readable storage medium that stores instructions for performing the steps of the above methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

FIG. 4 is a flow chart illustrating the processing of a security vulnerability submission associated with a website, according to an embodiment.

Figure 1:
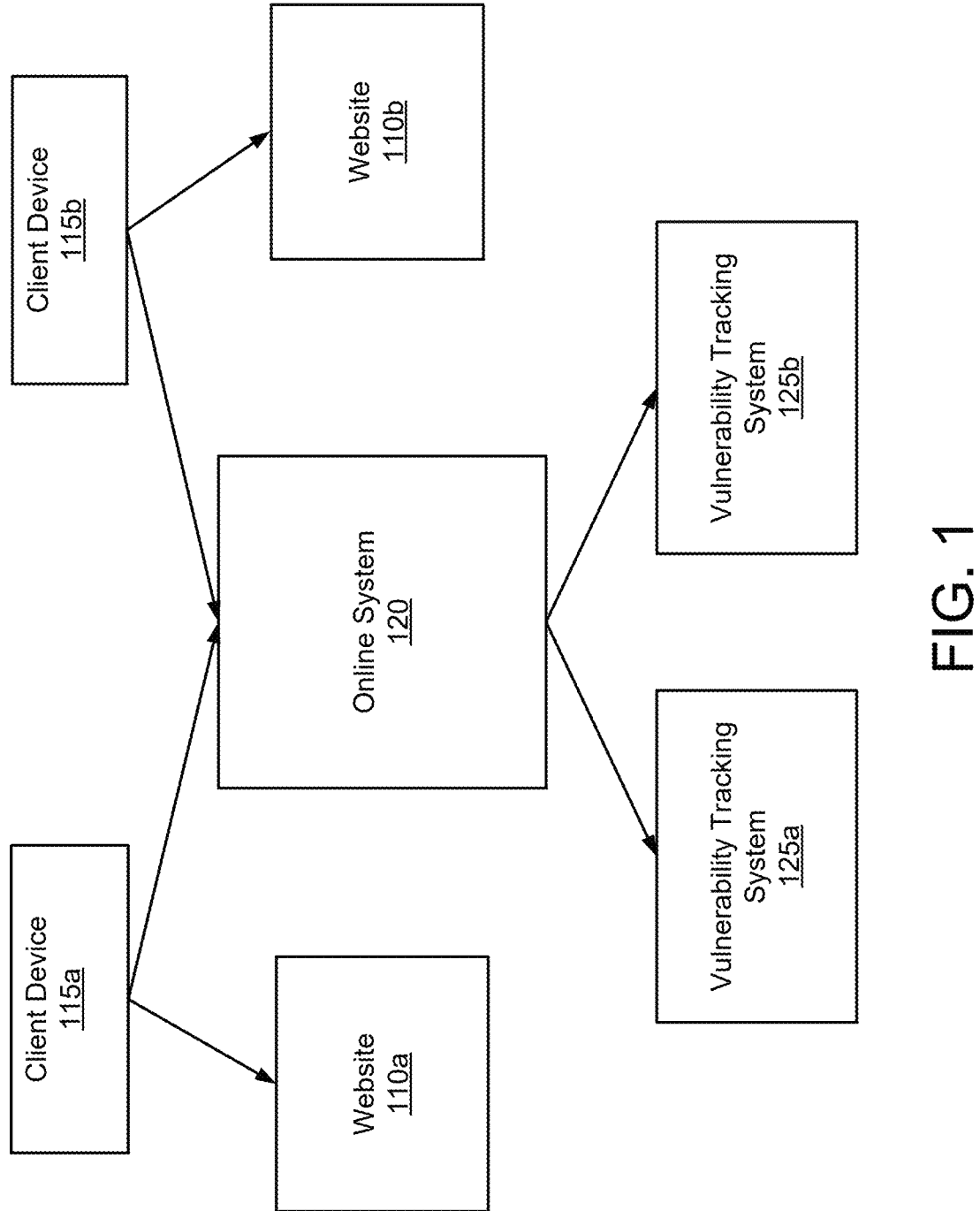
FIG. 1 is a block diagram of a system environment for processing security vulnerability submissions, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Organizations may use significant resources to identify security vulnerabilities. However, there may be security vulnerabilities that escape detection by the organization and be present in systems that are in production. Therefore, an online system according to various embodiments, allows organizations to use crowdsource mechanisms that allow users to report security vulnerabilities if they detect any in production. Optionally the online system allows the organization to reward the user for reporting such security vulnerabilities. A user providing submissions of security vulnerabilities is also referred to as a researcher.

The use of the online system 120 increases the likelihood of identifying security vulnerabilities via crowdsourcing since users are actively researching to identify security vulnerabilities and report them. The use of the widget improves the user experience for users submitting the security vulnerabilities and provides an improved user interface. As a result, more users are likely to report security vulnerabilities, thereby improving the security of the systems or websites of organizations.

System Environment

FIG. 1 is a block diagram of a system environment for processing security vulnerability submissions, according to an embodiment. The system environment includes an online system 120, one or more third-party websites 110a, 110b, one or more client devices 115a, 115b, and one or more vulnerability tracking systems 125a, 125b. The online system 120 allows users to submit security vulnerabilities in external systems such as third-party websites 110a, 110b. Accordingly, the online system uses crowdsourcing to identify security vulnerabilities. The online system 120 stores security vulnerabilities for multiple external systems. The system environment 100 may include other elements not shown in FIG. 1, for example, a network. The online system 120 may be referred to herein as a system. Certain steps of the system may be performed by the system in an offline fashion, for example, without using a network.

An external system may be associated with an organization. Examples of system defect include security vulnerabilities. A security vulnerability represents a weakness in a system or an application that may be exploited by an unauthorized user to gain access to the system and likely cause harm to the system. The harm to the system may be caused by loss of data, unauthorized access to data, unauthorized use of system resources which may in turn result in loss of availability of the system resources to authorized users, and so on. Vulnerabilities may exist due to various reasons, for example, system defects or bugs, design flaws, configuration errors, weak authentication mechanisms, and so on.

According to an embodiment, a website 110 displays a widget in one or more web pages. The widget may be a hosted widget, that represents a stand-alone application that is embedded into the website. The widget acts as a vulnerability disclosure portal that allows users of the website to submit disclosures of security vulnerabilities related to the website. The widget may publish information relevant vulnerabilities such as vulnerability disclosure policies to the users. The vulnerabilities may be associated with the website, for example, vulnerabilities of the website, vulnerabilities in a product such as a software system accessible via the website, or vulnerabilities in a product such as a software system described in the website, for example, a product distributed or sold via the website or simply described in the website. The widget enables users, for example, hackers who discover security vulnerabilities associated with the websites to simply and quickly submit those findings without having to navigate to a security page or sign up to a platform that supports such submissions.

Figure 2:
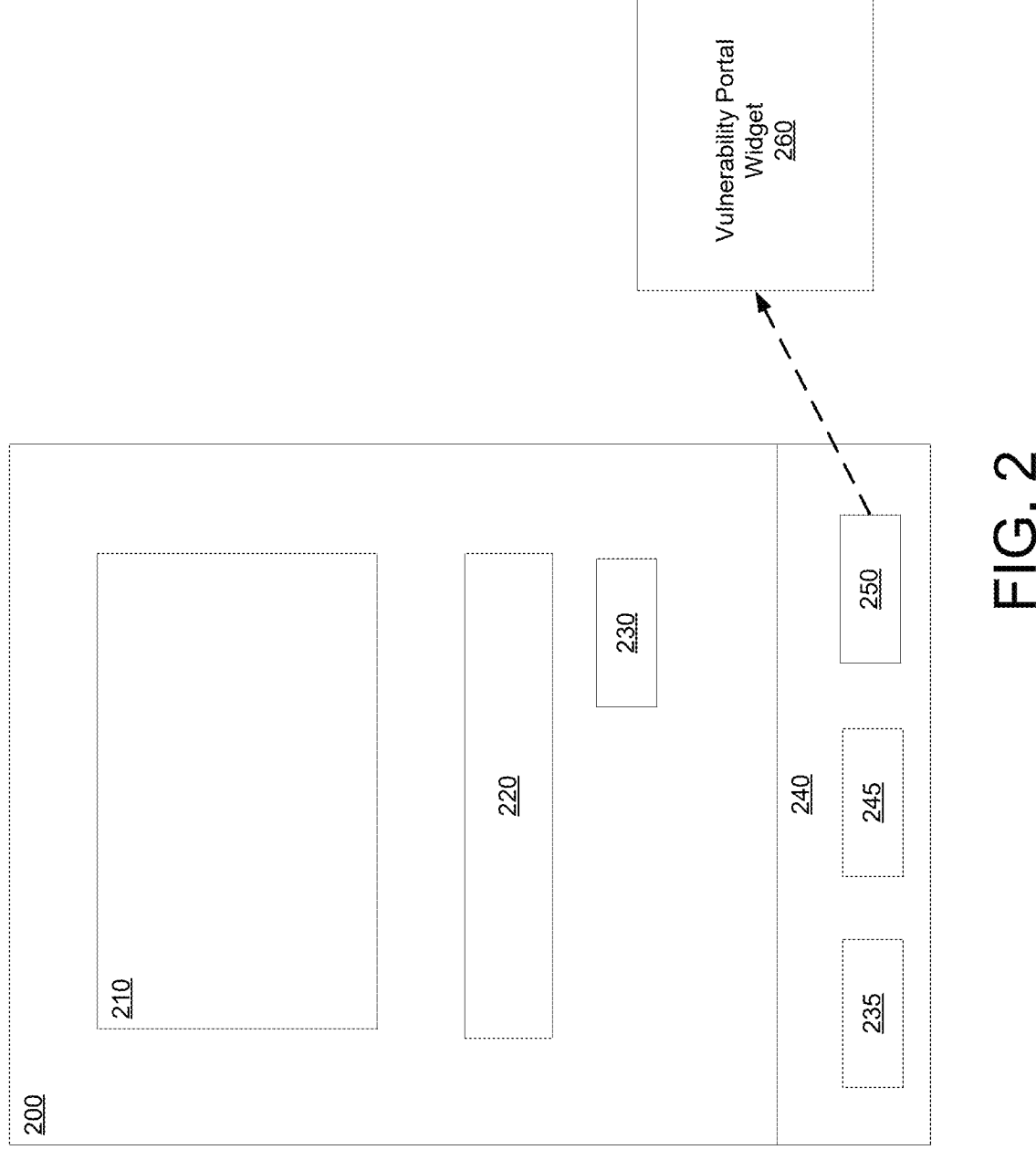
FIG. 2 shows an exemplary webpage illustrating a widget for receiving security vulnerabilities provided in a footer, according to an embodiment.

FIG. 2 shows an exemplary webpage illustrating a widget for receiving security vulnerabilities provided in a footer, according to an embodiment. Other embodiments may place the widget in other positions on the web page. The web page 200 includes various widgets 210, 220, 230, that may be text widgets, drop down lists, submit buttons, labels and so on. The webpage includes a footer 240 that may include one or more buttons 235, 245, 250. One of the buttons of the footer 240, for example, button 250 disclose a vulnerability portal widget 260 that allows users to submit security vulnerabilities. Accordingly, the vulnerability portal widget 260 may be hidden from view until a user clicks on a disclose button 250.

According to an embodiment, the online system 120 provides a snippet of code that, when embedded in a website, renders the widget in the correct location, such as the footer of a web page. The online system 120 provides a user interface that allows users associated with the websites, for example, web developers of the website to download the snippet of code. The user interface may allow developers of websites to configure multiple web pages, applications, application programming interface, and so on to allow access to the vulnerability portal widget 260 via a disclose button 250.

The online system 120 interacts with client applications that execute on client devices. The client application may be a web application that executes using a web browser. However, the client applications can be other types of application, for example, an application using proprietary communication protocols to interact with the online system 120.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the online system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 3:
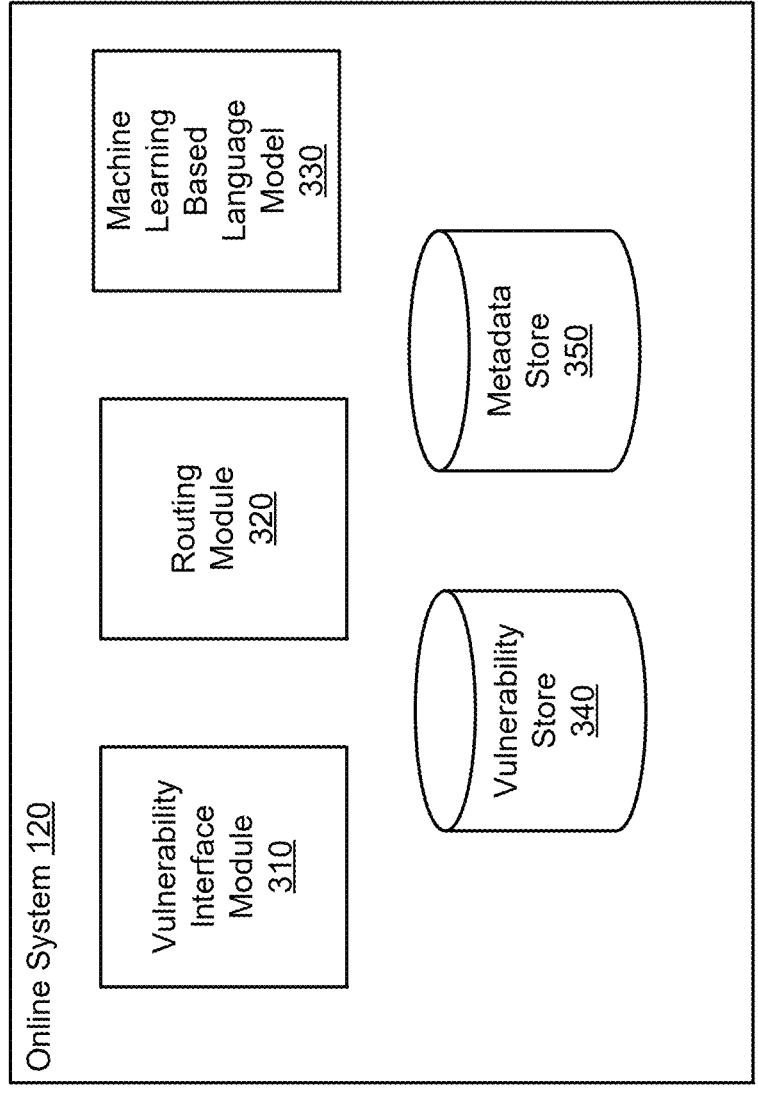
FIG. 3 is a block diagram illustrating components of an online system for processing security vulnerability submissions, according to one embodiment.

FIG. 3 is a block diagram illustrating components of an online system for processing security vulnerability submissions, according to one embodiment. The online system 120 comprises a vulnerability interface module 310, a routing module 320, a machine learning based language model 330, a vulnerability store 340, and an engagement metadata store 350. Other embodiments can have different and/or other components than the ones described here. Furthermore, the functionalities described herein can be distributed among the components in a different manner.

The vulnerability store 340 stores security vulnerabilities submitted by users. In an embodiment, the vulnerability store 340 is a database, for example, a relational database or a document-based database. The vulnerability store 340 stores various attributes describing a security vulnerability including information identifying website from which the security vulnerability as submitted, information identifying a particular webpage of the website from which the security vulnerability as submitted, information identifying a user that submitted the security vulnerability if the user provides such information, a time of submission of the security vulnerability, and so on. In an embodiment, the security vulnerability is described using unstructured text, for example, natural language description of the system defect.

The metadata store 350 stores metadata describing policies associated with security vulnerability disclosures and metadata describing engagements that various websites have with users that perform security vulnerability submissions. The information stored in the metadata store 350 may be obtained using user interfaces configured by the vulnerability interface module 310 and presented to users associated with the websites such as experts, system administrators, or developers.

The vulnerability interface module 310 interfaces with an expert user associated with a website to allow the users to configure one or more vulnerability disclosure policies. The vulnerability disclosure policies specify constraints on security vulnerability submissions, for example, constraints specifying the type of information required in a security vulnerability submission, a format of the information, and so on. The vulnerability interface module 310 may further configure the user interface to allows users associated with the website, for example, developers of the website to map specific applications, products or systems associated with the website to certain vulnerability disclosure policies. The vulnerability interface module 310 may further configure the user interface to allows users associated with the website, for example, developers of the website to provide a description of the information required in a security vulnerability submission. The description may be specified as a vulnerability brief provided by the user. According to an embodiment, the vulnerability interface module 310 configures and presents an interface that allows the expert user associated with the website to allow a vulnerability disclosure policy to be associated with a vulnerability brief.

The information received by the vulnerability interface module 310 may be stored in the metadata store 350. The system validates security vulnerability submissions against relevant vulnerability disclosure policies as part of downstream processing performed after receiving a security vulnerability submission.

The routing module 320, routes security vulnerability submission to an appropriate downstream processing that may provide the security vulnerability submission to the appropriate vulnerability tracking system 125. According to an embodiment, the security vulnerability submission comprises natural language description, and the routing module 320 uses the machine learning based language model 330 to identify the appropriate downstream processing for the security vulnerability submission.

In one embodiment, the machine learning based language model 330 is a large language model (LLM) that is trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While an LLM with a transformer-based architecture is described as an embodiment, in other embodiments, the machine learning based language model 330 can be configured as any other appropriate architecture including, but not limited to, long short-term memory (LSTM) networks, Markov networks, BART, generative-adversarial networks (GAN), diffusion models (e.g., Diffusion-LM), and the like.

The online system 120 processes a natural language text by generating a prompt with a question based on the natural language text. The online system 120 provides the prompt to the machine learning based language model 330. The online system 120 may either execute the machine learning based language model 330 if stored locally. If the machine learning based language model 330 is available as a service hosted by an external system, the online system 120 invokes an API of a service. Accordingly, the online system 120 sends the prompt to the service and receives a response obtained by execution of the machine learning based language model 330 by the service.

Overall Process

FIG. 4 is a flow chart illustrating the processing of a security vulnerability submission associated with a website, according to an embodiment. Various embodiments can perform the steps of the flowchart in different orders. Furthermore, various embodiments can include different and/or additional steps than the ones described herein. The steps are described as being performed by a system. The system that performs a step may be the online system 120 or the vulnerability disclosure widget.

The system receives 310, via a widget displayed on a webpage of a website, a request for submission of a security vulnerability associated with the website. The widget may be displayed on a plurality of webpages of the website 110, on user interfaces of applications associated with the website, and so on. The vulnerability portal widget may be further displayed on multiple websites 110.

The system configures 420 a user interface for receiving details of the security vulnerability. The details of the security vulnerability include a natural language description of the security vulnerability. For example, the user interface may include a text box that allows users to enter natural language description of the security vulnerability. The system sends for display, the user interface in association with the website. The user interface may be configured and sent by the online system 120. Alternatively, the user interface may be configured by the vulnerability portal widget 260 and displayed to the user of the client device 115.

The system receives 440 information describing the security vulnerability via the user interface. The system selects 450 downstream processing to be performed for the security vulnerability submission, for example, selecting a vulnerability tracking system from a plurality of vulnerability tracking systems 125 based on the details of the security vulnerability. The system routes the security vulnerability to the selected vulnerability tracking system 125. The routing may be performed via a secure channel.

The system according to various embodiments allows expert users associated with websites to flexibly create channels that begin within the vulnerability portal widget 260 by displaying one or many briefs, targets and disclosure policies. The vulnerability portal widget 260 allows a researcher or hacker to discover which brief to submit a security vulnerability to. The system uses an appropriate routing to get the submitted vulnerability to perform the appropriate downstream processing, for example, sending the security vulnerability to the correct vulnerability ticketing system 125.

The system disclosed herein allows websites to easily embed a vulnerability disclosure portal. The vulnerability disclosure portal is collapsed in a low-profile state until the researcher/hacker uses the disclose button 250 to expose a user interface that provides the details and steps for performing the security vulnerability submission. A website may configure a vulnerability disclosure portal with multiple vulnerability briefs, vulnerability policies and targets. This allows consistent handling of security vulnerability submissions for complex websites that include large number of web pages. The vulnerability disclosure portal streamlines the process of selecting the correct target product or system for which the security vulnerability submission is intended and submitting the security vulnerability. The vulnerability disclosure portal further streamlines transmitting the security vulnerability to the appropriate vulnerability ticketing system 125. The system may encrypt the data transfer using public/private keys. A website may choose one or many vulnerability disclosure portal widgets, vulnerability policies, vulnerability briefs and targets.

According to an embodiment, the system uses machine learning based language model 330 for processing natural language descriptions received from users, for example, the description of a security vulnerability received from a researcher, or the policy description or vulnerability brief received from an expert user associated with a website.

According to an embodiment, the online system 120 generates a prompt comprising the natural language description of the security vulnerability and a description of one or more downstream processing alternatives. The prompt requests the machine learning based language model 330 to select a downstream processing based on the natural language description of the security vulnerability. The online system 120 provides the prompt to the machine learning based language model. The online system 120 obtains a response generated by execution of the machine learning based language model 330. The online system 120 determines the downstream processing for the security vulnerability based on a response obtained by executing the machine learning based language model.

According to an embodiment, the online system 120 generates a prompt comprising the natural language description of the security vulnerability and a vulnerability brief or a vulnerability disclosure policy comprising a natural language text description. The prompt requests the machine learning based language model 330 to determine whether the natural language text representing the security vulnerability submission conforms to the vulnerability brief or a vulnerability disclosure policy. The online system 120 provides the prompt to the machine learning based language model. The online system 120 obtains a response generated by execution of the machine learning based language model 330 and determines whether the security vulnerability description conforms to the vulnerability brief or a vulnerability disclosure policy. If the response generated by the machine learning based language model 330 indicates that the security vulnerability description does not conform to the vulnerability brief or a vulnerability disclosure policy, the vulnerability portal widget 260 provides the information to the researcher/hacker requesting the researcher/hacker to revise the security vulnerability description. The online system 120 may request the machine learning based language model 330 to provide an explanation describing why the security vulnerability description does not conform to the vulnerability brief or a vulnerability disclosure policy. The vulnerability portal widget 260 may display in the user interface the explanation describing why the security vulnerability description does not conform to the vulnerability brief or a vulnerability disclosure policy.

According to an embodiment, the machine learning based language model is used to determine a severity of the vulnerability. The online system 120 generates a prompt comprising the natural language description of the security vulnerability and requests the machine learning based language model 330 to determine a severity level of the vulnerability based on the natural language description of the security vulnerability. According to an embodiment, the system includes examples of severity levels of previously encountered security vulnerabilities with the prompt. The system stores past security vulnerabilities of various external systems and receives feedback from expert users to determine their severity levels. The system selects examples of various severity levels and includes them in the prompt generated for the machine learning based language model. The system sends the prompt to the machine learning based language model and receives the response identifying a severity level for the security vulnerability described in the natural language description. The system may user the severity level to make downstream decisions, for example, to determine a priority of the security vulnerability. The priority of the security vulnerability may be specified in a defect that is created for the security vulnerability.

According to an embodiment, the system uses the machine learning based language model to determine duplicates of security vulnerabilities. For example, an external system may have a large number of submissions of security vulnerabilities. Multiple users may identify the same security vulnerabilities. Since the security vulnerabilities are specified using natural language descriptions, the system may not compare the security vulnerabilities using string matching or simple comparison. Accordingly, the system identifies possible duplicates of a security vulnerability by performing a semantic match. According to an embodiment, the system stores the natural language descriptions of various known security vulnerabilities in a vector database. Accordingly, the system generates a vector representation of the natural language description of each known security vulnerability and stores them in a vector database. When the system receives a new security vulnerability the system generates a vector representation of the new security vulnerability and determines one or more stored security vulnerabilities that are semantically closest to the new security vulnerability based on vector distances between the vector representation of the new security vulnerability and the vector representations of previously encountered security vulnerabilities.

According to an embodiment, the system determines matching security vulnerabilities based on a similarity metric such as cosine similarity to identify one or more stored security vulnerabilities that are similar to the new security vulnerability. The system selects the closest security vulnerabilities and if the similarity metric is below a threshold, thereby indicating that the selected security vulnerabilities closely match the new security vulnerability, the system determines that the new security vulnerability is a duplicate of an existing security vulnerability. If the system determines that the new security vulnerability is a duplicate of an existing security vulnerability, the system may not perform further processing of the new security vulnerability. The system may send a message to the user (or researcher) providing the new security vulnerability that the new security vulnerability is a duplicate of an existing security vulnerability and is therefore not accepted.

According to an embodiment, once the system selects one or more security vulnerabilities as matching a new security vulnerability, the system uses the machine learning based language model to confirm whether the new security vulnerability is a duplicate. Accordingly, the system generates a prompt including the natural language description of the new security vulnerability as well as the natural language description of one or more security vulnerabilities identified as security vulnerabilities matching the new security vulnerability based on the vector comparison. The system requests the machine learning based language model to determine whether the new security vulnerability is a duplicate of the selected one or more security vulnerabilities. The system receives the response of the machine learning based language model and determines based on the response, whether the new security vulnerability is a duplicate.

Computer Architecture

Figure 5:
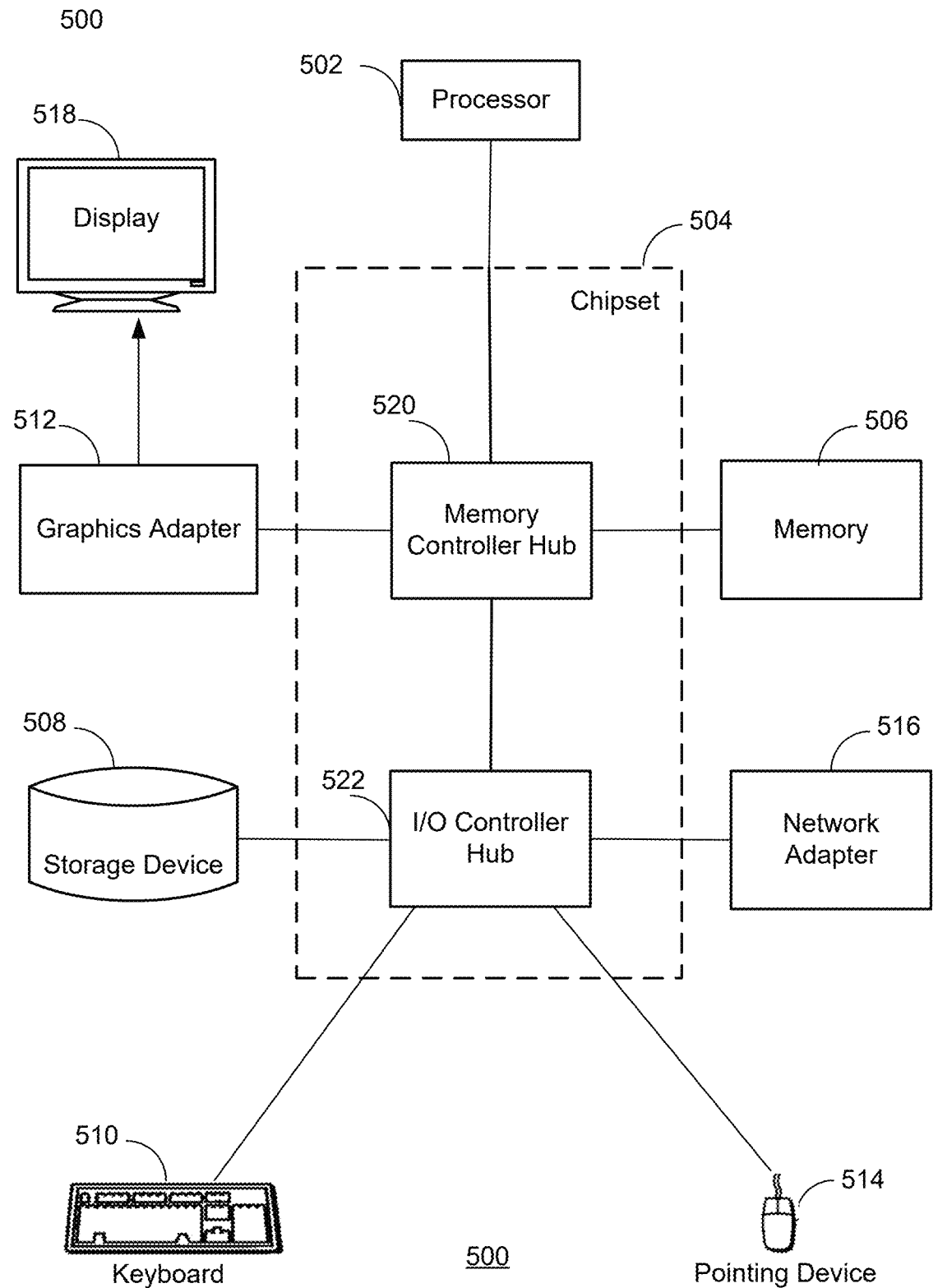
FIG. 5 is a high-level block diagram illustrating a functional view of a typical computer system for use as one of the entities illustrated in the environment 100 of FIG. 1 according to an embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a network.

As is known in the art, a computer 500 can have different and/or other components than those shown in FIG. 5. In addition, the computer 500 can lack certain illustrated components. For example, a computer system 500 acting as a server may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 115 may be a mobile phone with limited processing power, a small display 518, and may lack a pointing device 514. The online system 120, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method for processing security vulnerability submissions, the computer-implemented method comprising:

receiving, via a vulnerability disclosure portal widget displayed on a webpage of a website, a request for submission of a security vulnerability associated with the website, wherein the vulnerability disclosure portal widget is displayed on a plurality of webpages of the website and the vulnerability disclosure portal widget is further displayed on a plurality of websites, wherein the vulnerability disclosure portal widget is configured to provide a user interface for submitting disclosures of security vulnerabilities to a vulnerability tracking system;

configuring a user interface for receiving details of the security vulnerability;

sending for display, the user interface in association with the website;

receiving, via the user interface, information describing the security vulnerability;

selecting a vulnerability tracking system from a plurality of vulnerability tracking systems based on the details of the security vulnerability; and routing, via a secure channel, the security vulnerability to the vulnerability tracking system selected.

2. The computer-implemented method of claim 1, wherein the information describing the security vulnerability comprises a natural language description of the security vulnerability.

3. The computer-implemented method of claim 2, wherein the vulnerability disclosure portal widget is displayed on a particular webpage of the website, wherein the information describing the security vulnerability identifies the particular webpage.

4. The computer-implemented method of claim 2, wherein the vulnerability disclosure portal widget is displayed on a footer of each of one or more webpages of the website.

5. The computer-implemented method of claim 2, further comprising:

identifying one or more engagement criteria associated with a security vulnerability submission; and configuring the user interface to display the one or more engagement criteria.

6. The computer-implemented method of claim 1, further comprising:

determining a downstream processing by using a machine learning based language model to process a natural language description of the security vulnerability received.

7. The computer-implemented method of claim 6, wherein processing the natural language description of the security vulnerability using the machine learning based language model comprises:

generating a prompt comprising the natural language description of the security vulnerability and a description of one or more downstream processing alternatives, the prompt requesting a machine learning based language model to select a downstream processing based on the natural language description of the security vulnerability;

providing the prompt to the machine learning based language model; and determining the downstream processing for the security vulnerability based on a response obtained by executing the machine learning based language model.

8. A non-transitory computer readable storage medium storing instructions that when executed by one or more computer processors cause the one or more computer processors to perform steps comprising:

receiving, via a vulnerability disclosure portal widget displayed on a webpage of a website, a request for submission of a security vulnerability associated with the website, wherein the vulnerability disclosure portal widget is displayed on a plurality of webpages of the website and the vulnerability disclosure portal widget is further displayed on a plurality of websites, wherein the vulnerability disclosure portal widget is configured to provide a user interface for submitting disclosures of security vulnerabilities to a vulnerability tracking system;

configuring a user interface for receiving details of the security vulnerability;

sending for display, the user interface in association with the website;

receiving, via the user interface, information describing the security vulnerability;

selecting a vulnerability tracking system from a plurality of vulnerability tracking systems based on the details of the security vulnerability; and routing, via a secure channel, the security vulnerability to the vulnerability tracking system selected.

9. The non-transitory computer readable storage medium of claim 8, wherein the information describing the security vulnerability comprises a natural language description of the security vulnerability.

10. The non-transitory computer readable storage medium of claim 9, wherein the vulnerability disclosure portal widget is displayed on a particular webpage of the website, wherein the information describing the security vulnerability identifies the particular webpage.

11. The non-transitory computer readable storage medium of claim 9, wherein the vulnerability disclosure portal widget is displayed on a footer of each of one or more webpages of the website.

12. The non-transitory computer readable storage medium of claim 9, wherein the instructions further cause the one or more computer processors to perform steps comprising:

identifying one or more engagement criteria associated with a security vulnerability submission; and configuring the user interface to display the one or more engagement criteria.

13. The non-transitory computer readable storage medium of claim 8, wherein the instructions further cause the one or more computer processors to perform steps comprising:

determining a downstream processing by using a machine learning based language model to process a natural language description of the security vulnerability received.

14. The non-transitory computer readable storage medium of claim 13, wherein the instructions for processing the natural language description of the security vulnerability using the machine learning based language model cause the one or more computer processors to further perform steps comprising:

generating a prompt comprising the natural language description of the security vulnerability and a description of one or more downstream processing alternatives, the prompt requesting a machine learning based language model to select a downstream processing based on the natural language description of the security vulnerability;

providing the prompt to the machine learning based language model; and determining the downstream processing for the security vulnerability based on a response obtained by executing the machine learning based language model.

15. A computer system comprising:

one or more computer processors; and a non-transitory computer readable storage medium storing instructions that when executed by the one or more computer processors cause the one or more computer processors to perform steps comprising:

receiving, via a vulnerability disclosure portal widget displayed on a webpage of a website, a request for submission of a security vulnerability associated with the website, wherein the vulnerability disclosure portal widget is displayed on a plurality of webpages of the website and the vulnerability disclosure portal widget is further displayed on a plurality of websites, wherein the vulnerability disclosure portal widget is configured to provide a user interface for submitting disclosures of security vulnerabilities to a vulnerability tracking system;

configuring a user interface for receiving details of the security vulnerability;

sending for display, the user interface in association with the website;

receiving, via the user interface, information describing the security vulnerability;

selecting a vulnerability tracking system from a plurality of vulnerability tracking systems based on the details of the security vulnerability; and routing, via a secure channel, the security vulnerability to the vulnerability tracking system selected.

16. The computer system of claim 15, wherein the information describing the security vulnerability comprises a natural language description of the security vulnerability.

17. The computer system of claim 16, wherein the vulnerability disclosure portal widget is displayed on a particular webpage of the website, wherein the information describing the security vulnerability identifies the particular webpage.

18. The computer system of claim 16, wherein the instructions further cause the one or more computer processors to perform steps comprising:

identifying one or more engagement criteria associated with a security vulnerability submission; and configuring the user interface to display the one or more engagement criteria.

19. The computer system of claim 15, wherein the instructions further cause the one or more computer processors to perform steps comprising:

determining a downstream processing by using a machine learning based language model to process a natural language description of the security vulnerability received.

20. The computer system of claim 19, wherein the instructions for processing the natural language description of the security vulnerability using the machine learning based language model cause the one or more computer processors to further perform steps comprising:

generating a prompt comprising the natural language description of the security vulnerability and a description of one or more downstream processing alternatives, the prompt requesting a machine learning based language model to select a downstream processing based on the natural language description of the security vulnerability;

providing the prompt to the machine learning based language model; and determining the downstream processing for the security vulnerability based on a response obtained by executing the machine learning based language model.

* * * * *